United States Patent Office 2,820,073
Patented Jan. 14, 1958

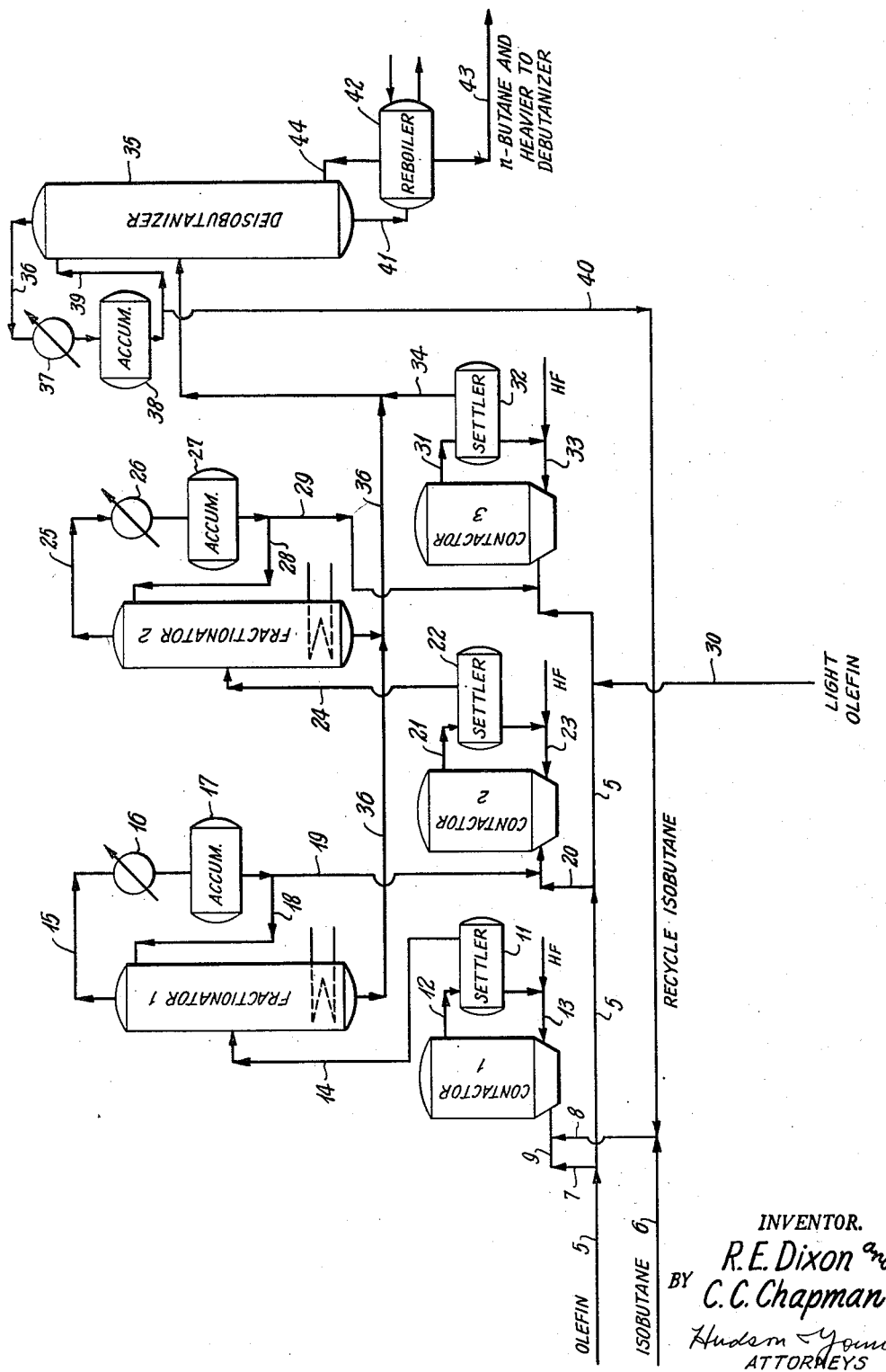

2,820,073

ALKYLATION OF HYDROCARBONS

Rolland E. Dixon and Charles C. Chapman, Bartlesville, Okla., assignors to Phillips Petroleum Company, a corporation of Delaware Application January 26, 1954, Serial No. 406,266

9 Claims. (Cl. 260—683.45)

This invention relates to the alkylation of hydrocarbons. In one of its aspects the invention relates to the alkylation of an isoparaffin with an olefin in the presence of a catalyst which is disposed in a plurality of reactors to each of which is fed at least a portion of the olefin to be reacted, the isoparaffin being fed initially to one of said reactors following reaction in which the alkylate, unreacted isoparaffin and normal paraffin in the reactor effluent is processed so as to remove therefrom substantially all of the alkylate and normal paraffin resulting in a stream of isoparaffin which is then fed to another of said reactors. In another of its aspects the invention relates to increasing the isoparaffin to olefin ratio as well as the isoparaffin to normal paraffin ratio in at least one of a plurality of reactors to which the isoparaffin-containing stream is passed serially in an existing unit, in which the capacity of the overall unit is sought to be increased, by passing said stream before it enters said reactor through a fractionation zone disposed in the line of flow ahead of said reactor and in said zone removing a substantial portion of the normal paraffin and substantially all of the alkylate which may be in said stream. Further, in another aspect, the invention provides for an increase in the capacity of an existing unit by the employ of at least one of said fractionation zones in combination with said plurality of reactors when olefins of different molecular weights are in the charge by feeding the lighter or lightest olefins to a downstream, preferably the last, reactor or contactor, thereby relieving the interposed fractionation zone of the burden of light inerts which are in the effluent of a reactor to which said olefins are charged.

In the alkylation of an isoparaffin with an olefin in the presence of a catalyst, say, hydrofluoric acid, the general overall operation includes a reaction or contacting step in which a preponderant proportion of isoparaffin and a small proportion of a suitable olefin are contacted in the presence of the catalyst at an alkylation temperature, say 50–200° F., preferably 80–120° F., in the case of hydrofluoric acid, and of this order in the case of other catalyst, for a time of about 5–20 minutes, at a pressure usually sufficient to maintain substantially the reactants in liquid phase, following which the hydrocarbon phase is separated from the catalyst phase and fractionated to recover therefrom minor quantities of catalyst and an isoparaffin containing stream for recycle to the contactors. Thus, in the case in which the isoparaffin is isobutane, there is employed a fractionation zone known to the art as a deisobutanizer. In the deisobutanizer there is separated from the hydrocarbon stream fed thereto, in addition to the alkylate, a substantial quantity of n-butane or normal paraffin.

According to this invention the normal paraffin originally contained in the isoparaffin charge to the unit and/or formed during the contacting in the presence of the catalyst, is substantially or largely removed from the effluent of at least one of the contactors or reactors in a series of reactors before the isoparaffin containing stream is passed to a later reactor and in view of the fact that there is available the deisobutanizer (deisoparaffinizer) it is possible, employing the combination of the said fractionation zone with said deisoparaffinizer, according to the invention, to so operate the said fractionator as to obtain the lowest proportion of normal paraffin in the said fractionator overhead (the isoparaffin stream) relying upon the said deisoparaffinizer to separate from the bottoms of the said fractionation zone the relatively small proportion of isoparaffin which will leave said zone together with said bottoms thus ultimately recovering the said small proportion of isoparaffin for reuse in the process.

In the drawing there is shown diagrammatically an embodiment of the modus operandi of the present invention.

It will be understood by those skilled in the art that the diagram omits many of the usual pieces of equipment and further that it is not drawn to scale. Thus, pumps, coolers, valves, some heat exchangers, flow controllers, and other equipment are not shown for the sake of simplicity.

Referring now to the drawing, there will be described in connection therewith the alkylation of isobutane with an olefin, for example, butylene. The butylene and isobutane are fed through conduits 5 and 6, respectively, into conduits 7 and 8, respectively, and conduit 9 into contactor 1. In contactor 1 the temperature and pressure conditions will be substantially those already set forth herein, and the catalyst will be hydrofluoric acid. It will be understood by those skilled in the art that the invention in its broadest aspect is not to be limited to hydrofluoric acid. Thus, alternate catalysts can be employed. For example, catalysts which are not necessarily equivalents but which will catalyze an alkylation reaction to form an alkylate product are well known in the art and include among others sulfuric acid, phosphoric acid, etc. After a suitable residence time, of say 15 minutes in contactor 1, which may be provided with cooling means, not shown, the contents of the contactor are passed into settler 11 wherein the catalyst phase is separated from the hydrocarbon phase, the acid phase is returned to contactor 1 and the hydrocarbon phase is passed to fractionator 1. Thus, the contactor contents are passed by way of conduit 12 into settler 11 wherein a period of time for settling is allowed to elapse. This results in the formation of the said hydrocarbon phase and the said acid phase. The acid phase is returned to contactor 1 by way of conduit 13 and the hydrocarbon phase is taken from the settler through conduit 14 into fractionator 1. Fractionator 1 will be operated usually to maintain a pressure of 130–175 pounds per square inch gauge, a bottom temperature of from about 230 to about 270° F., and a top temperature of from about 150 to about 170° F. Fractionator 1 is so operated as to obtain overhead a stream containing isobutane in a proportion which is substantially in excess of that in which the said isobutane is present in the charge to said fractionator. Thus, an overhead substantially enriched in isobutane passes by way of conduit 15 and heat exchanger 16 into accumulator 17. A portion of the overhead stream which collects in accumulator 17 can be returned to the top of fractionator 1 as reflux therefor by way of conduit 18. The remainder of the isobutane containing overhead is passed by way of conduit 19 into conduit 20 and finally into contactor 2. Contactor 2 can be operated substantially as described in connection with contactor 1. However, it is within the scope of the invention to differently operate contactor 2. Thus, in contactor 2 different isoparaffin and additional olefin which may be different from the original olefin can be included in the reaction. After a suitable contacting period the contactor contents are taken by way of conduit 21 into settler 22, the catalyst being returned by way of conduit 23 and the hydrocarbon phase being passed by way of conduit 24 into fractionator 2. Overhead from fractionator 2 passes by way of conduit 25, heat exchanger 26 into accumulator 27 from which a portion is employed as reflux by passing it through conduit 28, and the remainder is passed by way of conduit 29 and conduit 5 into contactor 3 for further reaction with additional olefin. The additional olefin can be the original olefin, in this example, butylene, alone or it can be a light olefin, earlier discussed, or a mixture of olefins. In any event, the light olefin, when used, is introduced to conduit 5 by way of conduit 30. As before conditions in contactor 3 are adapted to cause a desired alkylation. Accordingly, the conditions in contactor 3 can be substantially the same as in either or both of the other contactors or different as will be understood by those skilled in this art. Contactor contents are passed by way of conduit 31 into settler 32. Catalyst from settler 32 is returned by way of conduit 33 to contactor 3 and hydrocarbon phase is passed by way of conduit 34 into deisobutanizer 35 together with the bottoms from fractionators 1 and 2. Thus, the bottoms from fractionators 1 and 2 are passed by way of conduit 36 into conduit 34 and from there into deisobutanizer 35. In the deisobutanizer there is obtained as an overhead a stream rich in isoparaffin or isobutane, and this stream is taken off by way of conduit 36, heat exchanger 37, into accumulator 38 from which a portion can be returned as reflux for the column by way of conduit 39, the remainder passing by way of conduit 40 to conduits 8 and 9 for further reaction in contactor 1, and so on through the process as already described. Bottoms from the deisobutanizer will contain in addition to alkylate a considerable proportion of normal paraffin or normal butane. These bottoms are passed by way of conduit 41 to reboiler 42 from which normal butane and heavier are removed from the process by way of conduit 43. An amount sufficient to reboil the deisobutanizer column is passed by way of conduit 44 into the said column.

In the event that a mixture of olefins is the olefinic source available, the olefins can be fractionated according to a concept of this invention into heavier and lighter olefins, in a fractionation zone not shown, and passed as described into the respective contactors as already described.

The conditions to be employed in the various portions of the apparatus in addition to the conditions already described herein can be modified as will be within the scope of one skilled in the art in possession of this disclosure.

It will be noted that the operation of the invention wherein the lighter or light olefin stream is passed by way of conduit 30 into conduit 5 and into contactor 3 results in the handling of light inerts substantially only in the deisobutanizer. When a light olefin is thus used, the operation can be modified, according to principles well known in the art, to take into account the light inerts which will be present. Generally, the deisobutanizer will be operated at a pressure of about 130 to about 175 pounds per square inch gauge, a tower top temperature of about 150 to about 170° F., and a bottom temperature of about 250°–290° F.

It is within the scope of the invention to interpose a deisopropanizer for the removal of propane and lighter hydrocarbons prior to the deisobutanizer. Also, as well known within the skill of the art, there can be interposed into the system additional zones or vessels for the purification of the various streams at different places in the system the recovery of entrained quantities of catalyst, etc.

Generally, in fractionator 1 the proportion of isobutane in the charge thereto will be in the neighborhood of approximately 67 percent and the isobutane in the overhead will be in the neighborhood of 85 percent. In fractionator 2 these proportions will be respectively in the neighborhood of 64 and 85 percent.

Further, in connection with the combination of the fractionators or fractionating zones, according to the invention, with the deisobutanizer of an existing unit and the feeding of the light olefin to the last contactor, it is to be noted that the inerts do not pass through any succeeding contactor and do not load up the fractionators which are interposed according to the invention. Also, such inerts do not act as undesirable diluents in the contactors.

Although the invention is generally applicable to catalysts other than hydrofluoric acid or hydrogen fluoride, it is best adapted to this catalyst in view of the considerations respecting the composition of alkylate obtained with this catalyst. Therefore, the invention, in its now preferred form, is limited to hydrofluoric acid as a catalyst.

The following example shows representatively the approximate composition of various streams in the operation which has been described.

EXAMPLE

*Stream compositions (all in barrels per day)*

CHARGE TO CONTACTOR #1

| Component | Symbol | Olefin Feed, B./D. | Outside iC4, B./D. | Recycle iC4, B./D. | Total Charge, B./D. |
|---|---|---|---|---|---|
| Butenes | $C_4=$ | 1,200 | | | 1,200 |
| Isobutane | $iC_4$ | 900 | 1,780 | 8,120 | 10,800 |
| Normal Butane | $nC_4$ | 1,000 | 90 | 1,430 | 2,520 |
| Total | | 3,100 | 1,870 | 9,550 | 14,520 |

Isobutane to olefin ratio of 8.9 to 1.0

HYDROCARBON EFFLUENT FROM SETTLER #1

| Component | B./D. |
|---|---|
| HF | 40 |
| $iC_4$ | 9,360 |
| $nC_4$ | 2,520 |
| $iC_5$ | 120 |
| Light Alky | 1,847 |
| Heavy Alky | 132 |
| Total | 14,019 |

FRACTIONATOR #1

| Component | Charge, B./D. | Overhead, B./D. | Bottoms, B./D. |
|---|---|---|---|
| HF | 40 | 40 | |
| $iC_4$ | 9,360 | 8,700 | 660 |
| $nC_4$ | 2,520 | 1,535 | 985 |
| $iC_5$ | 120 | | 120 |
| L. A. | 1,847 | | 1,847 |
| H. A. | 132 | | 132 |
| Total | 14,019 | 10,275 | 3,744 |

CHARGE TO CONTACTOR #2

| Component | Olefin Feed, B./D. | Fract. #1, O'head, B./D. | Total, B./D. |
|---|---|---|---|
| $C_4=$ | 1,200 | | 1,200 |
| $iC_4$ | 900 | 8,700 | 9,600 |
| $nC_4$ | 1,000 | 1,535 | 2,535 |
| Total | 3,100 | 10,235 | 13,335 |

Isobutane to olefin ratio of 8.0 to 1.0

HYDROCARBON EFFLUENT FROM SETTLER #2

| Component | B./D. |
|---|---|
| HF | 36 |
| $iC_4$ | 8,160 |
| $nC_4$ | 2,535 |
| $iC_5$ | 120 |
| L. A. | 1,823 |
| H. A. | 144 |
| Total | 12,818 |

FRACTIONATOR #2

| Component | Charge, B./D. | Overhead, B./D. | Bottoms, B./D. |
|---|---|---|---|
| HF | 36 | 36 | |
| $iC_4$ | 8,160 | 7,500 | 660 |
| $nC_4$ | 2,535 | 1,325 | 1,210 |
| $iC_5$ | 120 | | 120 |
| L. A. | 1,823 | | 1,823 |
| H. A. | 144 | | 144 |
| Total | 12,818 | 8,861 | 3,957 |

CHARGE TO CONTRACTOR #3

| Component | Olefin Feed, B./D. | Fractionator #2 Overhead, B./D. | Total, B./D. |
|---|---|---|---|
| $C_4=$ | 1,200 | | 1,200 |
| $iC_4$ | 900 | 7,500 | 8,400 |
| $nC_4$ | 1,000 | 1,325 | 2,325 |
| Total | 3,100 | 8,825 | 11,925 |

Isobutane to olefin ratio of 7.0 to 1.0

HYDROCARBON EFFLUENT FROM SETTLER #3

| Component | B./D. |
|---|---|
| HF | 31 |
| $iC_4$ | 6,960 |
| $nC_4$ | 2,325 |
| $iC_5$ | 120 |
| L. A. | 1,783 |
| H. A. | 162 |
| Total | 11,381 |

DEISOBUTANIZER

| Component | Feed, B./D. | Overhead, B./D. | Bottoms, B./D. |
|---|---|---|---|
| HF | 31 | 31 | |
| $iC_4$ | 8,280 | 8,120 | 160 |
| $nC_4$ | 4,520 | 1,430 | 3,090 |
| $iC_5$ | 360 | | 360 |
| L. A. | 5,453 | | 5,453 |
| H. A. | 438 | | 438 |
| Total | 19,082 | 9,581 | 9,501 |

One of the important advantages of a system according to the invention as set forth and described herein is to be found in the ability of a unit embodying the system to maintain high isobutane to olefin ratios with much less precise fractionation and, therefore, less equipment investment than required in a conventional unit. Thus, fractionators 1 and 2 are designed to make only a rough separation between iso and normal paraffin, and this separation is much less precise than that required of a deisobutanizer. Thus, the number of trays and tower diameters are smaller and precise separation between iso and normal paraffin need be made on only a fraction of the normal paraffin which would be present in the deisobutanizer feed of a conventional unit.

Another advantage according to the invention is the possibility to advantageously segregate olefins according to type. For example, it is possible to fractionate olefins according to molecular weight and to feed lighter olefin, for example, propylene, to contactor 3 while feeding butylene to contactors 1 and 2.

It is understood by those skilled in the art that fractionators 1 and 2 can be replaced by a common tower provided the size of such a tower is not so large as to render combination less economical.

The following design calculations show equipment requirements and other factors inherent in the invention as compared with conventional units. Large savings are apparent. Olefin feed was maintained constantly.

|  | Series–Parallel | Conventional Units | | |
|---|---|---|---|---|
| $iC_4$ to Olefin Ratio | 8.01 avg | 7.5 | 6.9 | 6.0 |
| Contractors Required | 3 | 3 | 3 | 3 |
| Deisobutanizers: | | | | |
| 13' x 50 trays | 1 | 2 | 1 | 1 |
| 12' x 50 trays | 0 | 0 | 1 | 0 |
| 11' x 50 trays | 0 | 0 | 0 | 1 |
| Intermediate Towers (10' x 25 trays) | 2 | 0 | 0 | 0 |

Obviously, parallel deisobutanizers would be of the same size in actuality, however the above indicates that to approximate the same isobutane to olefin ratio as the series—parallel unit a conventional unit would require a 13' x 50 tray fractionator instead of two small 10' x 25 tray intermediate towers, representing a large investment difference. An investment balance would be more nearly obtained by construction of a unit for a 6.0 to 1.0 isobutane to olefin ratio. This lower ratio unit would produce only about 94 percent of the light alkylate obtainable from the series—parallel unit and would show lower alkylate quality.

Reasonable variation and modification are possible within the scope of the foregoing disclosure, drawing and appended claims to the invention, the essence of which is the provision of at least one fractionator zone, interposed following an alkylation zone and preceding a downstream alkylation zone in order to remove alkylate and normal paraffin from the effluent from the first alkylation zone before the isoparaffin is used for further alkylation in the later alkylation zone.

We claim:

1. An alkylation process which comprises the steps in combination as follows: (a) alkylating in an alkylation zone an isoparaffin with an olefin thus obtaining an alkylation effluent containing unreacted isoparaffin and normal paraffin, (b) fractionating said effluent to remove therefrom by a rough separation a substantial proportion but not all of said isoparaffin substantially free from normal paraffin and alkylate, thus obtaining a first stream containing substantially all of the normal paraffin and some isoparaffin and a stream containing substantially only isoparaffin, (c) passing said stream of isoparaffin obtained upon fractionating the said effluent as described to a second alkylation zone together with an olefin and alkylating isoparaffin with said olefin in said zone thus obtaining a second alkylation effluent, (d) fractionating said second alkylation effluent to remove therefrom by a rough separation a substantial proportion but not all of the isoparaffin contained therein substantially free of normal paraffin and alkylate, thus obtaining a second stream containing substantially all of the normal paraffin and some isoparaffin, (e) fractionating in a deisoparaffinizing zone the said first and second streams containing substantially all of the normal paraffin and some isoparaffin so as to obtain isoparaffin substantially free from normal paraffin and alkylate, (f) returning said isoparaffin to the process, (g) recovering a stream containing substantially all of said normal paraffin as a product of the process, (h) and recovering alkylate product from the process.

2. A method of increasing the capacity of an alkylation unit comprising a series of contactor zones, in which an isoparaffin is contacted with an olefin under alkylation conditions, thus obtaining from each zone an alkylation effluent containing unreacted isoparaffin, normal paraffin and alkylate, which comprises in a fractionating zone fractionating the effluent from each of said contactor zones to remove therefrom by a rough separation a substantial proportion but not all of said unreacted isoparaffin substantially free from normal paraffin and alkylate yielding a stream containing substantially all of the normal paraffin, alkylate and some isoparaffin originally contained in said alkylation effluents, returning said unreacted isoparaffin for use in at least one of said contactor zones, providing a deisoparaffinizing zone in said unit different from said fractionation zone, in said deisoparaffinizing zone deisoparaffinizing said stream containing some isoparaffin, the normal paraffin and the alkylate, returning to at least one of said contactor zones isoparaffin obtained in said deisoparaffinizing zone and recovering from said deisoparaffinizing zone as product of the process the normal paraffin and alkylate.

3. A method according to claim 2 wherein in each of the said contactor zones the olefins used are of a different molecular weight to permit alkylation with olefins according to type and molecular weight.

4. A method according to claim 2 wherein the alkylation is conducted in the presence of hydrofluoric acid as a catalyst and the catalyst is separated from the hydrocarbons and the alkylation effluent before fractionation thereof.

5. A method according to claim 2 wherein the isoparaffin is isobutane and the normal paraffin includes normal butane.

6. A method according to claim 3 wherein olefin fed to the unit contains butylene and propylene, wherein the butylene and propylene are separated and wherein the propylene is alkylated substantially only in a later contactor zone.

7. A method of increasing the capacity of an existing alkylation unit which comprises alkylating under suitable conditions an isoparaffin with an olefin, thus obtaining an alkylation zone effluent containing unreacted isoparaffin, normal paraffin and alkylate; in a fractionating zone fractionating said effluent to obtain therefrom by a rough separation a substantial proportion but not all of the isoparaffin substantially free from normal paraffin and alkylate and a stream containing substantially all of the normal paraffin, alkylate and some isoparaffin; returning said isoparaffin to an alkylation zone; providing a deisoparaffinizing zone different from said fractionating zone; feeding said stream containing substantially all of the normal paraffin, alkylate and some isoparaffin to said deisoparaffinizing zone; therein recovering from said stream fed thereto isoparaffin; returning said isoparaffin to an alkylation zone; and recovering from said deisoparaffinizing zone as products of the process normal paraffin and alkylate.

8. In an alkylation process which comprises alkylating in a series of alkylation zones an isoparaffin with an olefin the steps in combination as follows: (a) alkylating in an alkylation zone an isoparaffin with an olefin thus obtaining an alkylation effluent containing unreacted isoparaffin and normal paraffin, (b) fractionating said effluent to remove therefrom by a rough separation a substantial proportion of said isoparaffin substantially free from alkylate and containing not more than 15 percent normal paraffin, thus obtaining a first stream containing the remainder of all of the normal paraffin in said alkylation effluent, all of the alkylate and some isoparaffin and a stream containing not less than 85 percent isoparaffin, (c) passing said stream containing 85 percent of isoparaffin obtained upon fractionating the said effluent as described to a second alkylation zone together with an olefin and alkylating isoparaffin with said olefin in said zone, thus obtaining a second alkylation effluent, (d) fractionating said second alkylation effluent to remove therefrom by a rough separation a substantial proportion of the isoparaffin contained therein substantially free of alkylate and containing not more than 15 percent normal paraffin, thus obtaining a second stream containing the remainder of all of the normal paraffin in said alkylation effluent, all of the alkylate and some isoparaffin, (e) fractionating in a deisoparaffinizing zone the said first and second streams containing substantially all of the alkylate and said normal paraffin and some isoparaffin so as to separate substantially all of the isoparaffin from normal paraffin and alkylate, (f) returning said isoparaffin to the process, (g) recovering a stream containing said normal paraffin as a product of the process, (h) and recovering alkylate product from the process.

9. An alkylation process which comprises alkylating isobutane with at least one olefin selected from the group consisting of butylene and propylene in a series of alkylation zones which comprises the steps in combination as follows: (a) alkylating in an alkylation zone isobutane with at least one of said olefins, thus obtaining an alkylation effluent containing unreacted isobutane and normal butane, (b) fractionating said effluent to remove therefrom by a rough separation a substantial proportion of said isobutane substantially free from alkylate and containing not more than 15 percent normal butane, thus obtaining a first stream containing the remainder of all of the normal butane in said alkylation effluent, all of the alkylate and some isobutane and a stream containing not less than 85 percent isobutane, (c) passing said stream containing 85 percent of isobutane obtained upon fractionating the said effluent as described to a second alkylation zone together with at least one of said olefins and alkylating isobutane with said olefin in said zone, thus obtaining a second alkylation effluent, (d) fractionating said second alkylation effluent to remove therefrom by a rough separation a substantial proportion of the isobutane contained therein substantially free of alkylate and containing not more than 15 percent normal paraffin, thus obtaining a second stream containing the remainder of all of the normal butane in said alkylation effluent, all of the alkylate and some isoparaffin, (e) fractionating in a deisoparaffinizing zone the said first and second streams containing substantially all of the alkylate and said normal butane and some isobutane so as to separate substantially all of the isobutane from normal butane and alkylate, (f) returning said isobutane to the process, (g) recovering a stream containing said normal butane as a product of the process, (h) and recovering alkylate product from the process.

References Cited in the file of this patent
UNITED STATES PATENTS

| Re. 22,146 | Goldsby et al. | July 28, 1942 |
| 2,416,013 | Matuszak | Feb. 18, 1947 |
| 2,417,251 | Hemminger | Mar. 11, 1947 |
| 2,426,559 | Matuszak | Aug. 26, 1947 |
| 2,448,601 | Kelley | Sept. 7, 1948 |
| 2,536,514 | Penick | Jan. 2, 1951 |
| 2,536,515 | Penick | Jan. 2, 1951 |